United States Patent Office 3,846,287
Patented Nov. 5, 1974

3,846,287
HYDRODESULFURIZATION
Joseph Jaffe and Echol M. Reed, Jr., Berkeley, Calif., assignors to Chevron Research Company, San Francisco, Calif.
No Drawing. Filed July 23, 1973, Ser. No. 382,085
Int. Cl. C10g 23/02
U.S. Cl. 208—216     6 Claims

ABSTRACT OF THE DISCLOSURE

A process for hydrodesulfurizing a heavy oil feedstock which comprises contacting the heavy oil, under hydrodesulfurization reaction conditions, with a hydrodesulfurization catalyst comprising Group VIb and Group VIII metals and an amorphous alumina carrier containing 50 to 2000 p.p.m. calcium, wherein the carrier is prepared by mixing a calcium compound with hydrated alumina and acidified water, thereby forming a paste; extruding the paste; and calcining the resulting extrudate. Preferred feeds are residua such as atmospheric fractionator column bottoms or vacuum fractionator column bottoms from the distallation of crude oil.

BACKGROUND OF THE INVENTION

The present invention relates to hydrodesulfurization using a catalyst containing Group VIb and Group VIII metals, more particularly a catalyst prepared so as to include a specific Group II metal.

Catalytic hydrodesulfurization of oils containing sulfur is an old and well-known process, see for example U.S. Pat. 1,932,369. However, there is a continuing need to improve hydrodesulfurization processes to achieve greater economy of operation. The need for improvement is accentuated by the desire or need for economical pollution abatement. One prime means of achieving pollution abatement is by hydrodesulfurization of fuels to reduce their sulfur content so that less sulfur dioxide is emitted upon burning the fuel.

U.S. Pat. 3,112,257 discloses the use of an alkali metal such as sodium, lithium or potassium to increase the stability of a hydrodesulfurization catalyst. According to U.S. Pat. 3,112,257 the alkali metal can be added by impregnation but preferably the various catalyst components are mixed by mechanical means, followed by tableting the mixture to form a pellet. U.S. Pat. 3,112,257 contemplates 10 to 80 weight percent alkali metal carbonate in the final catalyst.

U.S. Pat. 3,594,312 discloses a hydrodesulfurization catalyst promoted with at least 0.5 weight percent alkali metal such as sodium.

Various patents have suggested the use of a hydrodesulfurization catalyst containing a Group II alkaline earth metal such as magnesium as a part of the catalyst support or as a major part of the metals on the catalyst support. For example, U.S. Pat. 2,640,009 discloses nickel sulfide and tungsten sulfide on a silica-magnesia support; U.S. Pat. 2,853,429 discloses a catalyst comprising molybdenum-cobalt-aluminum and major amounts of magnesia, and U.S. Pat. 3,705,097 discloses a catalyst containing 1 to 10 percent Group VIII metal and 5 to 25 percent magnesium supported on alumina or silica.

SUMMARY OF THE INVENTION

In accordance with the present invention a process is provided for hydrodesulfurizing a heavy oil feedstock, which process comprises contacting the heavy oil, under hydrodesulfurization reaction conditions, with a hydrodesulfurization catalyst comprising a Group VIb and a Group VIII metal or metal compound, and an amorphous alumina carrier containing 50 to 2000 p.p.m. calcium, wherein the catalyst is prepared by mixing a calcium compound with hydrated alumina and water, thereby forming a paste; extruding the paste; and calcining the resulting extrudate. The Groups VIb and VIII metals or metal compounds are typically added to the extrudate by impregnation. The amount of hydrate (water) in the hydrated alumina preferably is between about 5 weight percent and 35 weight percent. Preferably the water used is acidified water containing an acid which is readily removed by catalyst calcination, such as acetic acid or nitric acid. The amount of acid preferably is from about 0.1 to 3 weight percent of the pure acid (the weight percent being calculated based on the weight of dry alumina in the mixture).

Preferred feedstocks are residua such as atomspheric fractionator column bottoms or vacuum fractionator column bottoms from the distillation of crude oil. The heavy oil feedstocks fed to the process of the present invention preferably contain at least 50 volume percent material boiling above 500° F. Also the heavy oil feedstock will contain sulfur, usually above 0.5 weight percent sulfur, such as feedstocks containing 1 to 3 weight percent sulfur.

The temperature, pressure and hydrogen feed rate in the hydrodesulfurization process of the present invention are typical compared to ranges previously disclosed for hydrodesulfurization processes wherein organic sulfur compounds of the hydrocarbon feedstock are catalytically converted to form sulfur-free organic compounds and volatile $H_2S$ which can be separated as a gas. Thus, suitable hydrodesulfurization conditions include a temperature between about 600 and 900° F., a pressure between 100 and 5,000 p.s.i.g., and a hydrogen feed rate between 100 and 15,000 standard cubic feet of hydrogen per barrel of hydrocarbon feed.

Among other factors the present invention is based on our finding that small amounts of calcium improve a hydrodesulfurization catalyst containing a Group VIb and a Group VIII metal on a support comprising alumina, and more particularly that this improvement is achieved when the calcium is added by mixing the calcium compound with an alumina carrier material to form a paste followed by extruding the paste. We have found that the addition of calcium to a pre-calcined alumina base by impregnation does not seem to operate to give the improvements which we have found are attained when calcium is added to the alumina carrier material by mixing as in accordance with the present invention.

Preferably the calcium mixing with the alumina carrier material is by comulling, using equipment suitable for mixing heavy pastes. Suitable comulling can be carried out, for example, by using a sigma-blade kneader, vertical blade dough mixer, pan muller, and the like.

Preferred amounts of calcium in the hydrodesulfurization catalyst used in the process of the present invention are between 100 and 1000 parts per million (p.p.m.) by weight. Amounts of calcium given herein are in part by weight of calcium as the element, though the combined form is visualized as comprising bonding of calcium atoms to oxygen atoms on the alumina surface. We have found that amounts of calcium above about 2000 p.p.m. are not helpful to the catalyst used in our process and instead appear to be deleterious to the catalyst. We have found most advantageous results are obtained when the amount of calcium is between about 300 and 700 p.p.m., for example about 500 p.p.m.

Preferably the alumina used to prepare the catalyst used in the present invention is a relatively pure alumina such as is produced as a by-product from Ziegler higher alcohol synthesis. For disclosure of Ziegler higher alcohol synthesis and the production of by-product alumina, see U.S. Pat. 2,892,858, particularly Example 1.

Preferred particle density for the alumina support which contains calcium, according to the process of the present invention, is between 0.8 and 1.1 grams per cc.

The present invention can be applied to sulfur-containing heavy feedstocks such as gas oils from crude oil atmospheric or vacuum distillation columns. Preferred feedstocks for the process of the present invention are residua fractions of crude oil such as atmospheric fractionator column bottoms and vacuum fractionator column bottoms.

Although various Group VIII and Group VIb metals can be used in our catalyst, cobalt and molybdenum are preferred. These metals may be in compound form in the catalyst such as in the form of oxides and/or sulfides.

EXAMPLES

Two catalysts were prepared: catalyst A in accordance with the present invention and reference catalyst B.

Catalyst A was prepared so as to obtain a catalyst containing 500 p.p.p. calcium. The preparation was as follows: 513 grams of powdered hydrated alumina containing 10 percent volatiles was mixed with 750 grams of water containing 3 cc. glacial acetic acid and 2 grams of calcium acetate. The mixing was carried out to obtain a pasty mixture. The pasty mixture was extruded through a 1/16-inch diameter die. The extrudate was dried and calcined to a maximum temperature of 1400° F. Then the extrudate was soaked in a metals impregnating solution containing cobalt acetate and phosphomolybdic acid. In particular, 200 grams of the calcined extrude was immersed in a solution containing 87.3 grams cobalt acetate, 169.3 grams phosphomolybdic acid and sufficient water so that the impregnating solution was three times the pore volume of the alumina extrudate material. The extrudate material was allowed to soak for ½-hour and then was drained, dried and calcined to 950° F.

The reference catalyst B was prepared similar to catalyst A except that no calcium acetate was used.

Properties of catalyst A and reference catalyst B are summarized in Table I. Properties of a third catalyst containing 2400 p.p.m. calcium are also given in Table I; the third catalyst is labeled catalyst C.

The catalysts were tested for desulfurization performance using Arabian light atmospheric residuum feed. The test conditions included a pressure of 1150 p.s.i.g., a hydrogen feed rate of 2,200 standard cubic feet per barrel of hydrocarbon feed, an LHSV of about 0.75 and a temperature starting near 700 and extending with increasing onstream time to higher temperatures. The feed was passed through the catalyst bed upwardly. Results from the performance tests are summarized in Table II.

As can be seen from the results in Table II, catalyst A, the catalyst in accordance with the present invention, had lower fouling rate by a factor of about 50 percent and also had better activity by about 8° F., both compared to catylyst B which was substantially free of calcium. Catalyst C had comparable fouling rate to catalyst A but its activity was poorer by about 19° F.

In further performance tests, a catalyst was prepared by impregnating calcium on a different alumina support which had already been calcined in the absence of calcium. No improvement in fouling rate resulted, and the activity rate was 12° F. poorer.

TABLE I

| Catalyst | B | A | C |
| --- | --- | --- | --- |
| Run | 79-127 | 79-129 | 63-137 |
| Catalyst description (p.p.m. Ca) | <10 | 500 | 2,400 |
| Catalyst number | HM 1277 | HM 1308 | HM 1303 |
| Composition: | | | |
| Co (wt. percent) | 3.0 | 2.7 | 2.7 |
| Mo (wt. percent) | 13.0 | 12.5 | 12.6 |
| Ca, p.p.m | <10 | 500 | 2,400 |
| Properties: | | | |
| Particle size, mm | 1.32 | 1.37 | 1.40 |
| Particle density, g./cc. | 1.18 | 1.13 | 1.09 |
| Pore volume, cc./g | 0.62 | 0.584 | 0.722 |
| Surface area, m.$^2$/g | 152 | 165 | 174 |
| Pore diameter, angstroms | 163 | 142 | 166 |
| Bulk density, lb./ft.$^3$ | 42.7 | 47.2 | 41.0 |

TABLE II

| Catalyst | B | A | C |
| --- | --- | --- | --- |
| Run | 79-127 | 79-129 | 63-137 |
| Catalyst description (p.p.m. Ca) | <10 | 500 | 2,400 |
| Catalyst number | HM 1277 | HM 1308 | HM 1303 |
| Particle density, g./cc. | 1.18 | 1.13 | 1.09 |
| Feed number, WOW | 2,515 | 2,515 | 2,515 |
| Feed sulfur, wt. percent | 2.81 | 2.81 | 2.81 |
| Product sulfur, wt. percent | 0.48 | 0.45 | 0.44 |
| LHSV, hr.$^{-1}$ | 0.75 | 0.75 | 0.74 |
| $k_s$=LHSV [1/$S_p$1/$S_f$] | 1.30 | 1.40 | 1.42 |
| Fouling rate, ° F./hr | 0.22 | 0.125 | 0.125 |
| $T_o$, ° F | 714 | 706 | 725 |
| Normalized (0.75 LHSV, 0.45% S): | | | |
| Fouling Rate, ° F./hr | 0.255 | 0.125 | 0.128 |
| $T_o$, ° F | 717 | 706 | 724 |
| Bulk density, lb./ft.$^3$ | 42.7 | 47.2 | 41.0 |

What is claimed is

1. A process for hydrodesulfurizing a heavy oil feedstock which comprises contacting the heavy oil, under hydrodesulfurization reaction conditions, with a hydrodesulfurization catalyst comprising a Group VIb metal or metal compound and a Group VIII metal or metal compound, and an amorphous alumina carrier containing 50 to 2000 p.p.m. calcium, wherein the carrier is prepared by mixing a calcium compound with hydrated alumina and water, thereby forming a paste; extruding the paste; and calcining the resulting extrudate.

2. A process in accordance with Claim 1 wherein the calcium compound is mixed with the hydrated alumina by comulling and the water is acidified with 0.1 to 3.0 weight percent acid.

3. A process in accordance with Claim 2 wherein the alumina carrier contains 100 to 1000 p.p.m. calcium.

4. A process in accordance with Claim 2 wherein the alumina is produced by removing water from aluminum hydroxide produced as a by-product from a Ziegler higher alcohol synthesis reaction.

5. A process in accordance with Claim 4 wherein the feedstock is a residuum oil.

6. A process in accordance witeh Claim 5 wherein the Group VIb metal is molybdenum, the Group VIII metal is cobalt, and the alumina carrier contains about 300–700 p.p.m. calcium.

References Cited

UNITED STATES PATENTS 3,694,350  9/1972  Wennerberg _____ 208—216
3,702,291  11/1972  Jacquin et al. _____ 208—216

FOREIGN PATENTS 627,160  9/1961  Canada _____ 208—216

CURTIS R. DAVIS, Primary Examiner